United States Patent [19]  
Araya et al.

[11] Patent Number: 4,567,566  
[45] Date of Patent: Jan. 28, 1986

[54] DEMAND ESTIMATION APPARATUS

[75] Inventors: Shinji Araya, Takarazuka; Shintaro Tsuji, Nagoya, both of Japan

[73] Assignee: Mitsubishi Denki Kabushiki Kaisha, Japan

[21] Appl. No.: 473,359

[22] Filed: Mar. 8, 1983

[30] Foreign Application Priority Data

Jun. 28, 1982 [JP] Japan .................... 57-111165

[51] Int. Cl.[4] .............. G06F 15/56; G06F 15/46; B66B 1/20
[52] U.S. Cl. ............................. 364/554; 187/29 R; 340/825.06; 364/493; 364/569; 364/571
[58] Field of Search ............... 179/2 AM; 324/76 R, 324/103 R, 113, 116; 340/635, 825.06, 825.18, 825.26, 19 A; 364/483, 492, 493, 550, 554, 569, 571, 437, 148, 152; 187/29 R

[56] References Cited

U.S. PATENT DOCUMENTS

| 3,652,838 | 3/1972 | Dillon et al. | 364/493 |
| 4,044,860 | 8/1977 | Kaneko et al. | 187/29 R |
| 4,179,654 | 12/1979 | Germer | 364/492 |
| 4,305,479 | 12/1981 | Bittar et al. | 187/29 R |
| 4,386,397 | 5/1983 | Saeki | 364/148 |
| 4,458,787 | 7/1984 | Uetani | 187/29 R |
| 4,473,134 | 9/1984 | Uetani | 187/29 R |

FOREIGN PATENT DOCUMENTS 48-15501 5/1973 Japan .  
55-56963 4/1980 Japan .  
1523202 8/1978 United Kingdom .

Primary Examiner—Felix D. Gruber  
Assistant Examiner—James Rose  
Attorney, Agent, or Firm—Leydig, Voit & Mayer, Ltd.

[57] ABSTRACT

An apparatus wherein a demand fluctuating substantially cyclically is divided into a plurality of sections having predetermined time intervals and wherein the demand is estimated for each section on the basis of the measured result of the demand in the section, characterized in that an adjusting section is set in the vicinity of the boundary between two sections adjoining each other, and that the estimation value of the demand in the adjusting section is compared with the respective estimation values of the two sections, so as to shift the boundary in the direction of widening the section which has the estimation value closer to the estimation value of the adjusting section. Thus, the demand in the vicinity of the boundary is estimated with the estimation value of the widened section, and it can be estimated at high precision.

8 Claims, 12 Drawing Figures

FIG. 6

| | 33 | | | 33 | |
|---|---|---|---|---|---|
| 41 | TIME | | | PUL(1) | 58 |
| 42 | T(1) | | | PUL(2) | 59 |
| 43 | T(2) | | | PUL(3) | 60 |
| 44 | T(3) | | | PDL(1) | 61 |
| 45 | T(4) | | | PDL(2) | 62 |
| 46 | LDU | | | PDL(3) | 63 |
| 47 | LDD | | | EL(2) | 64 |
| 48 | PU(1) | | | EL(3) | 65 |
| 49 | PU(2) | | | DAY(2) | 66 |
| 50 | PU(3) | | | DAY(3) | 67 |
| 51 | PD(1) | | | J | 68 |
| 52 | PD(2) | | | | |
| 53 | PD(3) | | | | |
| 54 | QU(2) | | | | |
| 55 | QU(3) | | | | |
| 56 | QD(2) | | | | |
| 57 | QD(3) | | | | |

FIG. 7

| | 34 |
|---|---|
| 71a | SA |
| 72a | SB |
| 73a | A |
| 74a | B |
| 75a | DT |
| 76a | T1 |
| 77a | T2 |
| 78a | T3 |
| 79a | T4 |
| 80a | PU1 |
| 81a | PU2 |
| 82a | PU3 |
| 83a | PD1 |
| 84a | PD2 |
| 85a | PD3 |
| 86a | E2 |
| 87a | E3 |

DEMAND ESTIMATION APPARATUS

BACKGROUND OF THE INVENTION

This invention relates to improvements in a demand estimation apparatus for estimating a demand which fluctuates depending upon time zones, such as the traffic volume of elevators in a building and the electric power load of a power station.

The traffic volume of elevators in a building, the electric power load of a power station, or the like (hereinbelow, termed "demand") fluctuate irregularly when closely observed within a period of one day, but present similar aspects for the same time zones when observed over several days. In, for example, an office building, elevator passengers on their way to their office floors crowd on the first floor during a short period of time in the time zone in which they attend offices in the morning. In the first half of the lunch hour, many passengers go from the office floors to a restaurant floor, while in the latter half thereof, many passengers go from the restaurant floor and the first floor to the office floors. In addition, many passengers go from the office floors to the first floor in the time zone in which they leave the offices in the evening. The volume of traffic in the up direction and in the down direction are nearly equal in the daytime time zones other than mentioned above, while the volume of traffic becomes very small throughout the nighttime.

In order to deal with the traffic in the building changing in this manner by means of a limited number of elevators, the elevators are usually operated under group supervision. One of the important roles of the group supervision of the elevators is to assign an appropriate elevator to each hall call registered. Various assignment systems for the hall calls have been proposed. By way of example, there has been considered a system wherein, when a hall call is registered anew, it is tentatively assigned to respective elevators, and the waiting times of all hall calls, the possibility of the full capacity of passengers, etc. are predicted to calculate service evaluation values for all the cases, from among which the appropriate elevator is selected. In order to execute such predictive calculations, traffic data peculiar to each respective building is required. For example, data on the number of passengers who get on and off the cage of each elevator at intermediate floors are required for predicting the possibility of the full capacity. When such traffic data which changes every moment is stored each time, an enormous memory capacity is necessitated, which is not practical. Usually the required memory size is reduced by dividing the operating period of time in one day into several time zones, wherein only the average traffic volumes of the respective time zones are stored. After the completion of the building, however, there is a possibility that traffic data will change in accordance with changes in personnel organization in the building, and hence, it is difficult to obtain good traffic data with which the demand can be predicted accurately. For this reason, there has been proposed a system wherein traffic conditions in the building are continuously detected so as to sequentially improve traffic data.

More specifically, the operating period of time in one day is divided into K time zones (hereinbelow, termed "sections"), and a time (hereinbelow, termed "boundary") by which a section $k-1$ and a section $k$ are bounded is denoted by $t_k$ ($k=2, 3, \ldots, K$). Times $t_1$ and $t_{K+1}$ are the starting time and end time of the elevator operation, respectively. The average traffic volume $P_k$ (l) of the section k on the l-th day is given by the following Equation (1):

$$P_k(l) = \frac{1}{t_{K+1} - t_K} \begin{bmatrix} X_k^u(l) \\ X_k^d(l) \\ Y_k^u(l) \\ Y_k^d(l) \end{bmatrix} \quad (1)$$

Here, $X_k^u$ (l) is a column vector of $F-1$ dimensions (where F denotes the number of floors) the elements of which are the number of passengers to get on cages in the up direction at respective floors in the time zone k of the l-th day. Similarly, $X_k^d$ (l), $Y_k^u$ (l) and $Y_k^d$ (l) are column vectors which indicate the number of passengers to get on the cages in the down direction, the number of passengers to get off the cages in the up direction and the number of passengers to get off the cages in the down direction, respectively. (Where the letters X and Y represents the number of people getting on and off the elevator, respectively, and u and d represent the upward and downward direction of the elevator, respectively.) The average traffic volume (hereinbelow, termed "average demand") $P_k$ (l) is measured by a passenger-number detector which utilizes load changes during the stoppage of the cages of the elevators and/or industrial television, ultrasonic wave, or the like.

First, it will be considered to sequentially correct the representative value of the average demand $P_k$ (l) of each time zone in a case where the boundary $t_k$ which is the demarcating time between adjoining time zones is fixed.

It is thought that the columns $\{P_k(1), P_k(2), \ldots \}$ of the average demands occurring daily will range in the vicinity of a certain representative value $\hat{P}_k$. Since the magnitude of the representative value $\hat{P}_k$ is unknown, it needs to be estimated by any method. In this case, there is the possibility that the magnitude itself of the representative value $\hat{P}_k$ will change. The representative value is therefore predicted by taking a linear weighted average given in Equations (2) and (3) below and attaching more importance to the average demand $P_k$ (l) measured latest, than to the other average demands $P_k$ (1), $P_k$ (2), ... and $P_k$ (l-1).

$$\hat{P}_k(l) = (1-a)^l P_k(O) + \sum_{i=1}^{l} \lambda_i P_k(i) \quad (2)$$

$$\lambda_i = a(1-a)^{l-i} \quad (3)$$

Here, $\hat{P}_k$ is the representative value which has been predicted from the average demands $P_k$ (1), ... and $P_k$ (l) measured till the l-th day, and $P_k$ (O) is an initial value which is set to a suitable value and is set in advance. $\lambda_i$ denotes the weight of the average demand $P_k$ (i) measured on the i-th day, and this weight changes depending upon a parameter a. More specifically, an increase in the value of the parameter a results in an estimation in which more importance is attached to the latest measured average demand $P_k$ (l) than to the other average demands $P_k$ (1), ... and $P_k$ (l-1), and in which the predictive representative value $\hat{P}_k$ (l) quickly follows up the change of the representative value $P_k$. However, when the value of the parameter a is too large, it is feared that the predictive representative value will change too violently in a manner to be influenced by the random variations of daily data. Meanwhile, Equations (2) and (3) can be rewritten as follows:

$$\hat{P}_k(l-a) P_k(l-1) = +a P_k(l) \qquad (4)$$

$$\hat{P}_k(O) = P_k(O) \qquad (5)$$

In accordance with the above Equation (4), there is the advantage that the weighted average of Equation (2) can be calculated without storing the observation values $P_k(i)$, $(i=1, 2, \ldots, 1-1)$ of the average demands in the past.

However, granted that the foregoing representative value $P_k(k=2, 3, \ldots, K)$ of the average demand of each time zone has been precisely estimated, the deviation thereof from the actual demand is feared to become large near the demarcating boundary $t_k(k=2, 3, \ldots, K)$ when the boundary $t_k$ itself is inappropriate. This large deviation brings about the disadvantage that the predictive calculations of the waiting times, the possibility of the full capacity, etc. become erroneous, so the elevators are not group-supervised as intended.

SUMMARY OF THE INVENTION

This invention has been made in view of the disadvantage described above, and has for its object to provide a demand estimation apparatus wherein the period of time during which similar fluctuations in demand arise cyclically is divided into a plurality of sections so as to estimate the demand for each section, characterized in that the boundary between the respectively adjacent sections is automatically set, whereby the demand in the vicinity of the boundary can be estimated at high precision.

BRIEF DESCRIPTION OF THE DRAWINGS

FIGS. 1 and 2 illustrate the outline of this invention, in which:

FIG. 1 is an explanatory diagram showing fluctuations in demand; and

FIG. 2 is a flowchart showing a method of correcting a boundary.

FIGS. 3 to 12 illustrate an embodiment of this invention, in which:

FIG. 3 is an explanatory diagram showing fluctuations in a demand in the form of the number of persons who move in the up direction;

FIG. 4 is an explanatory diagram showing fluctuations in a demand in the form of the number of persons who move in the down direction;

FIG. 5 is a block diagram showing an elevator system to which a demand estimation apparatus according to this invention has been applied;

FIGS. 6 and 7 are arrayal diagrams of memories;

FIG. 8 is a diagram showing the general flow of programs;

FIG. 9 is a diagram showing an initializing program;

FIG. 10 is a diagram showing an up demand calculating program;

FIG. 11 is a diagram showing an average demand estimating program; and

FIG. 12 is a diagram showing a boundary correcting program.

In the drawings, the same symbols indicate the same or corresponding parts.

DESCRIPTION OF THE PREFERRED EMBODIMENT

Figure 1:
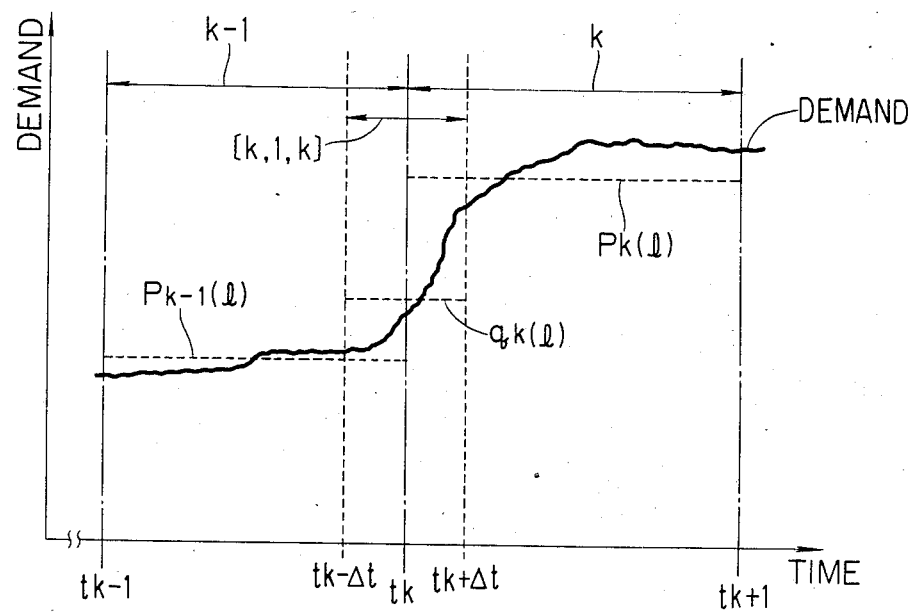
Figure 2:
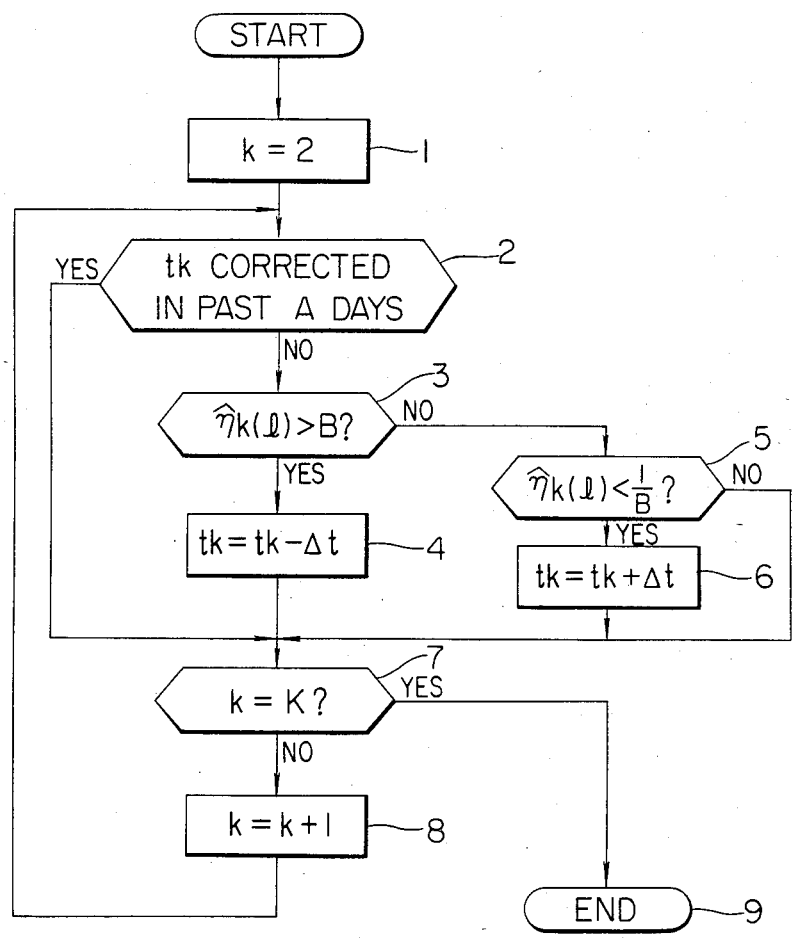

Referring to FIGS. 1 and 2, there will be first described the outline of a procedure in the case where the boundary between respectively adjacent sections is corrected by a demand estimation apparatus according to this invention.

FIG. 1 illustrates in detail a section $k-1$ and a section $k$ among K sections into which a demand expressed in one dimension is divided. In the figure, $[k-1, k]$ denotes an adjusting section which has been previously set with its center at the boundary $t_k$ $(k=2, 3, \ldots, K)$ between the section $k-1$ and the section $k$ and which has a time width $2\Delta t$. $P_{k-1}(l)(k=2, 3, \ldots, K)$ denotes the average demand which has been measured in the section $k-1$ on the l-th day, as indicated by Equation (1). Likewise, $q_k(l)(k=2, 3, \ldots, K)$ denotes an average demand which has been measured in the adjusting section $[k-1, k]$ on the l-th day. The boundary $t_k$ is set at $t_k$ as it is, or it is shifted a unit time $\Delta t$ and set at $t_k - \Delta t$ or $t_k + \Delta t$. In the decision, a character $\hat{\eta}_k(l)$ expressed by the following Equation (6) is used:

$$\hat{\eta}_k(l) = (1 - b)\hat{\eta}_k(l - 1) + b\, \eta_k(l) \qquad (6)$$

$$\eta_k(l) = \frac{\| P_{k-1}(l) - q_k(l) \|^2}{\| P_k(l) - q_k(l) \|^2} \qquad (7)$$

Here, $\| \ \|$ denotes a norm, and b is a parameter which corresponds to the parameter a of Equation (4).

The character $\eta_k(l)$ calculated using Equation (7) expresses a comparative result on the extent to which the measured average demand $q_k(l)$ of the adjusting section $[k-1, k]$ is similar to either the measured average demand $P_{k-1}(l)$ of the section $k-1$ or the measured average demand $P_k(k)$ of the section $k$. $\eta_k(l)=1$ expresses that the average demand $q_k(l)$ is substantially intermediate both the average demand $P_{k-1}$ and the average demand $P_k$. $\eta_k(l)>1$ expresses that the average demand $q_k(l)$ is more similar to the average demand $P_k$ than to the average demand $P_{k-1}$, whereas $\eta_k(l)<1$ expresses that the average demand $q_k(l)$ is more similar to the average demand $P_{k-1}(l)$ than to the average demand $P_k(l)$. As the value of the character $\eta_k(l)$ becomes larger (subject to $\eta_k(l)>1$), the extent of the similarity of the average demand $q_k(l)$ to the average demand $P_{k-1}$ increases more in comparison with that to the average demand $P_k$. Conversely, as the value of the character $\eta_k(l)$ comes closer to zero (subject to $\eta_k(l)<1$), the extent of the similarity of the average demand $q_k(l)$ to the average demand $P_k$ increases more in comparison with that to the average demand $P_{k-1}$. Likewise, the character $\hat{\eta}_k(l)$ expresses a comparative result on the extent to which the predicted representative value $\hat{q}_k(l)$ of the adjusting section $[k-1, k]$ is similar to either the predicted representative value $\hat{P}_{k-1}(l)$ of the section $k-1$ or the predicted representative value $\hat{P}_k(l)$ of the section $k$. It has characteristics akin to those of the charactor $\eta_k(l)$. The character $\hat{\eta}_k(l)$ can also be calculated by the following Equation (8):

(equivalent to Equations (6) and (7))

$$\hat{n}_k(l) = \frac{\| \hat{P}_{k-1}(l) - \hat{q}_k(l) \|^2}{\| \hat{P}_k(l) - \hat{q}_k(l) \|^2} \qquad (8)$$

FIG. 2 is a flowchart showing the procedure in which the boundary $t_k$ is set. Referring to the figure, at Step 1, the initial value of the section is set at k=2. If, at Step 2, the boundary $t_k$ has been corrected or initialized within the past A days, the control flow proceeds to Step 7 without correcting the boundary $t_k$. Otherwise, the control flow proceeds to Step 3, in which a decision based on the character $\hat{\eta}_k(l)$ expressed by Equation (6) is made. More specifically, when the character $\eta_k(l)$ is greater than a constant value B, this denotes that a representative value $\hat{q}_k(l)$ (calculated similarly to Equations (4) and (5)) predicted from the average demand in the adjusting section [k−1, k] is closer to the representative value $\hat{P}_k(l)$ predicted from the average demand of the section k than to the representative value $\hat{P}_{k-1}(l)$ predicted from the average demand of the section k−1, over a predetermined reference (determined by the constant value B). Therefore, the control flow proceeds to Step 4, in which the boundary $t_k$ between the section k−1 and the section k is decreased the unit time Δt and corrected to be $t_k$−Δt. When, at Step 5, the character $\eta_k(l)$ is smaller than a constant value 1/B, which denotes that the predicted representative value $q_k(l)$ of the average demand of the adjusting section [k−1, k] is closer to the predicted representative value $\hat{P}_{k-1}(l)$ of the average demand of the section k−1 than to the predicted representative value $\hat{P}_k(l)$ of the average demand of the section k, over a predetermined reference (determined by the constant value 1/B), the control flow proceeds to Step 6, in which the boundary $t_k$ between the section k−1 and the section k is increased the unit time Δt and corrected into $t_k$+Δt. In addition, when the character $\eta_k(l)$ lies between the constant values B and 1/B, the boundary $t_k$ between the section k−1 and the section k is decided to be appropriately set, and it is not corrected. At Step 7, it is decided whether or not the corrections have ended for all the boundaries $t_k$ (k=2, 3, ..., K). If they have not ended, the value of the section k is increased by 1 (one) at Step 8, and the control flow returns to Step 2, whereupon the processing described above is repeated. In this manner, Steps 2-8 are repeated until k in Step 7 becomes equal to the number K of the sections.

Here, the unit time Δt, the number of days A and the constant value B govern the characteristics of the above procedure. The number of days A is the number of days required for the character $\hat{\eta}_k(l)$ to converge, and during which the boundary $t_k$ is not corrected. As the constant value B is made smaller, a finer correction is made. However, when it is too small with respect to the unit time Δt, hunting (the phenomenon in which corrections in one direction and corrections in the opposite direction are repeated) may arise.

The boundary setting procedure described above is greatly advantageous in that it can be realized with a small memory capacity. More specifically, the adjusting section [k−1, k] is an imaginary section provided for correcting the boundary $t_k$. The average demands $q_k(l)$(k=2, 3, ..., K) measured in the adjusting section [k−1, k] need not be stored, and becomes unnecessary after the character $\eta_k(l)$ of Equation (7) has been calculated. In the boundary setting procedure illustrated in FIG. 2, therefore, only the values of the characters $\eta_k(l)$(k=2, 3, ..., K) which are unidimensional data need to be kept stored as data.

Referring now to FIGS. 3 to 12, an embodiment of this invention will be described as to a demand which is expressed in two dimensions.

Figure 3:
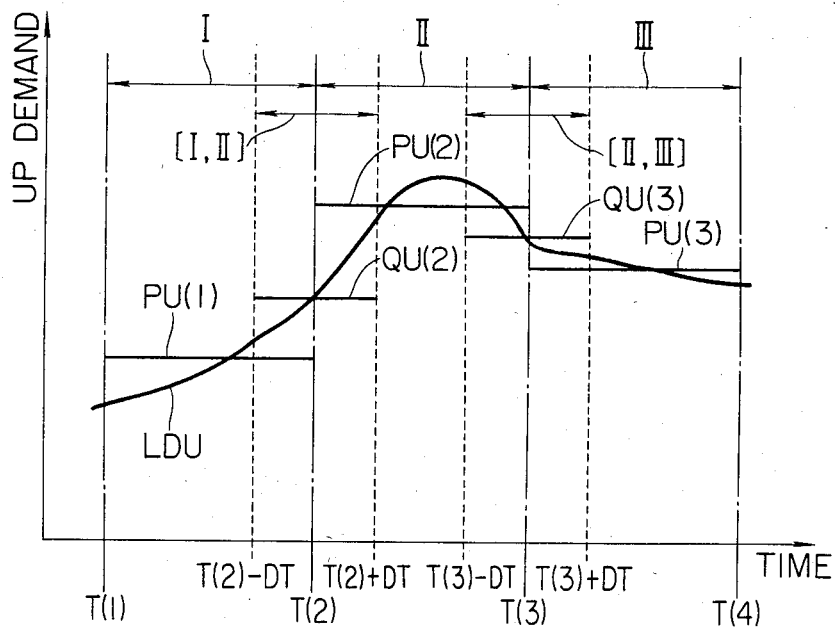
Figure 4:
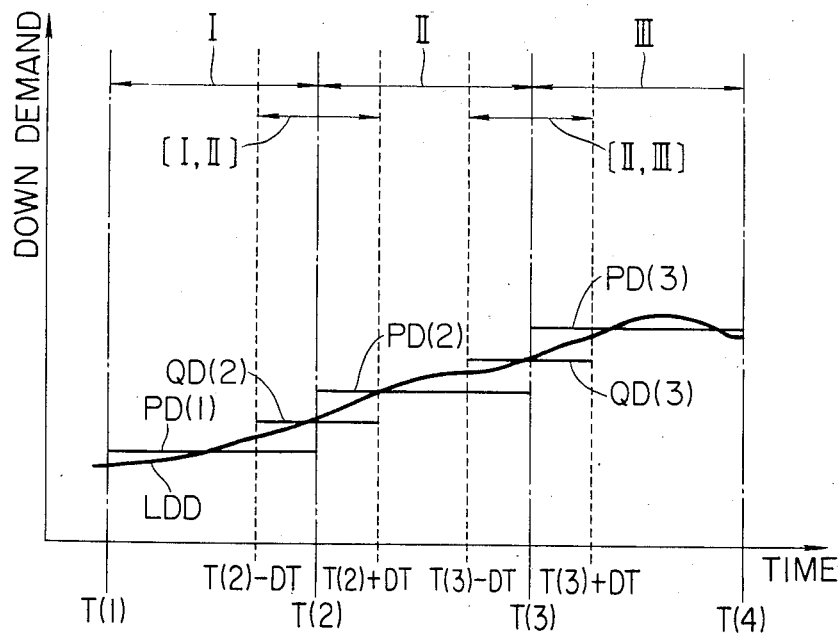

FIGS. 3 and 4 illustrate demands in the form of the numbers of persons who move in the up direction and in the down direction within a building, respectively. In the ensuing description, LDU indicates the direction demand which is obtained in such a way that the numbers of persons who move in the up direction at predetermined times are measured and totaled for all floors, and the total value is cumulated every unit time DT (set at 5 minutes). Similarly, LDD indicates the down direction demand which is obtained in such a way that the numbers of persons who move in the down direction at predetermined times are measured and totaled for all the floors, and the total value is cumulated every unit time DT. T(1) denotes the boundary which is the starting time of a section I, T(2) the boundary between the section I and a section II, T(3) the boundary between the section II and a section III, and T(4) the boundary which is the end time of the section III. [I, II] indicates an adjusting section which is imaginarily provided with its center at the boundary T(2) and which has a time width equal to double the unit time DT, while [II, III] similarly indicates an adjusting section at the boundary T(3). PU(1) and PD(1) indicate an average up direction demand and an average down direction demand in the section I, respectively. They correspond to the average traffic volume $P_k(l)$ resulting when values obtained by cumulating the up direction demand LDU and the down direction demand LDD in the section I are respectively substituted into $X_k^u(l)$ and $X_k^d(l)$ in Equation (1), and $Y_k^u(l)=0$ and $Y_k^d(l)=0$ are assumed. Likewise, PU(2) and PD(2), and PU(3) and PD(3) indicate an average up direction demand and an average down direction demand in the section II, and an average up direction demand and an average down direction demand in the section III, respectively. QU(2) and QD(2) denote an average up direction demand and an average down direction demand in the adjusting section [I, II], respectively. They correspond to the average demand $q_k(l)$ resulting when values obtained by cumulating the up direction demand LDU and the down direction demand LDD as to the adjusting section [I, II] are respectively substituted into $X_k^u(l)$ and $X_k^d(l)$ in Equation (6), and $Y_k^u(l)=0$ and $Y_k^d(l)=0$ are assumed, thereby providing adjusted estimation demand values of the sections with the shifted boundary.

Figure 5:
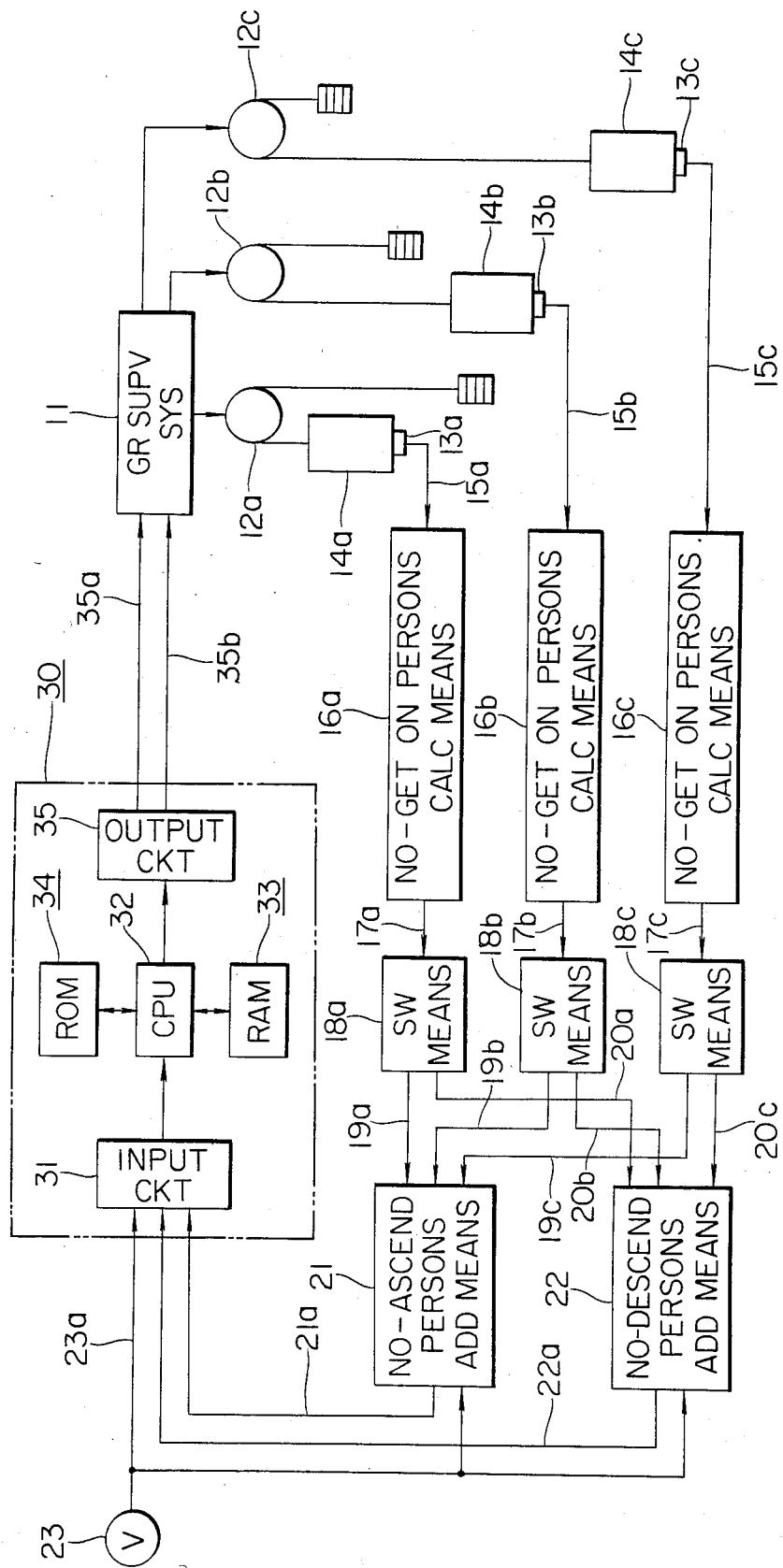

Referring now to FIG. 5, numeral 11 designates a group supervisory system which group-supervises three elevators 12a, 12b and 12c. As a practical example of this group supervisory system, there is one shown in FIG. 4 of U.S. Pat. No. 4,244,450. Although, in the group supervisory system of the abovementioned patent, any circuit using the adjusted estimated demands PUL(1)-PUL(3) and PDL(1)-PDL(3) of this invention (signals delivered by the delivering means including signal lines 35a and 35b in FIG. 5) is not taught, "waiting time estimation circuits 13a-13c" can be used for waiting time prediction instead. By way of example, a stoppage time (135U3) is changed depending upon the numbers of persons who get on and off a car. Symbols 13a, 13b and 13c designate number-of-persons detection means which are constructed of known weighing devices disposed under the floors of the cages 14a, 14b and 14c of the elevators 12a, 12b and 12c, respectively. They provide number-of-persons signals 15a, 15b and 15c proportional to the actual numbers of passengers, respectively. Symbols 16a, 16b and 16c indicate number-of-getting on persons calculation means for calculating the numbers of persons who have gotten on the cages 14a, 14b and 14c, as taught as "number-of-passengers detector 1" in, e.g., Japanese Laid-open Patent Application No. 51-97155 (corresponding to U.S. Pat. No. 4,044,860). They detect the minimum values of the respective number-of-persons signals 15a, 15b and 15c at the times when doors (not shown) are open. Further, they subtract the minimum values of the number-of-persons signals 15a, 15b and 15c from the number-of-persons signals 15a, 15b and 15c immediately before the cages 14a, 14b and 14c start after the closure of the doors, thereby to provide number-of-getting on persons signals 17a, 17b and 17c, respectively. Switching means 18a, 18b and 18c deliver the number-of-getting on persons signals 17a, 17b and 17c to signal lines 19a, 19b and 19c while the elevators 12a, 12b and 12c are continuing their ascent operations, and they deliver the number-of-getting on persons signals 17a, 17b and 17c to signal lines 20a, 20b and 20c while the elevators are continuing their descent operations, respectively. Numbers-of-ascending persons addition means 21 adds the respective number-of-getting on persons signals 17a, 17b and 17c inputted by the signal lines 19a, 19b and 19c and cumulates them for the unit time DT, and it provides an up-direction number-of-passengers signal 21a obtained by the cumulation. Numbers-of-descending persons addition means 22 adds the respective number-of-getting on persons signals 17a, 17b and 17c inputted by the signal lines 20a, 20b and 20c and cumulates them for the unit time DT, and it provides a down-direction number-of-passengers signal 22a obtained by the cumulation. As for the switching means 18a–18c, the numbers-of-descending persons addition means 21 and the numbers-of-descending persons addition means 22, it is possible to use "device 2 for detecting the direction and floor of an elevator", "device 3 for detecting the numbers of passengers for individual floors and directions", "device 4 for generating a predetermined period signal" and "device 5 for calculating the total numbers of passengers in individual directions" described in Japanese Laid-open Patent Application No. 51-97155 (U.S. Pat. No. 4,044,860) cited before. Clock means 23 produces a timing signal 23a each time the unit time DT lapses, thereby to reset the up-direction number-of-passengers signal 21a and the down-direction number-of-passengers signal 22a to zero. Control means 30 is constructed of an electronic computer such as a microcomputer. It is composed of an input circuit 31 which is constructed of a converter for receiving the up-direction number-of-passengers signal 21a, the down-direction number-of-passengers signal 22a and the timing signal 23a, a central processing unit 32 which operates an processes the respective signals received by the input circuit 31, a random access memory (hereinbelow, termed "RAM") 33 which stores data such as the operated results of the central processing unit (hereinbelow, termed "CPU") 32, a read only memory (hereinbelow, termed "ROM") 34 which stores programs, constant value data, etc., and an output circuit 35 which is constructed of a converter for delivering signals from the CPU 32. The signal lines 35a and 35b transmit the signals of the output circuit 35 to the group supervisory system 11, respectively.

FIG. 6 shows the contents of the RAM 33. Referring to the figure, numeral 41 indicates a memory area in which a time TIME obtained from the timing signal 23a is stored. In memory areas 42–45, the boundaries T(1)–T(4) expressed by times are stored. A memory area 46 stores the up direction demand LDU which is the up-direction number-of-passengers signal 21a accepted, while a memory area 47 stores the down direction demand LDD which is the down-direction number-of-passengers signal 22a accepted. Memory areas 48–50 store the average up-direction demands PU(1)–PU(3) in the sections I–III respectively, while memory areas 51–53 store the average down-direction demands PD(1)–PD(3) in the sections I–III respectively. The average up-direction demands QU(2) and QU(3) in the adjusting sections [I, II] and [II, III] are respectively stored in memory areas 54 and 55, while the average down-direction demands QD(2) and QD(3) in the adjusting sections [I, II] and [II, III] are respectively stored in memory areas 56 and 57. Memory areas 58–60 store predictive average up-direction demands PUL(1)–PUL(3) which correspond to the representative value $\hat{P}_k$ (l) obtained by substituting the average up-direction demands PU(1)–PU(3) into Equation (4), respectively, while memory areas 61–63 store predictive average down-direction demands PDL(1)–PDL(3) which correspond to the representative values $\hat{P}_k$ (l) obtained by substituting the average down-direction demands PD(1)–PD(3) into Equation (4), respectively. In memory areas 64 and 65, there are respectively stored charactors EL(2) and EL(3) (corresponding to $\hat{\eta}_k$ (l) in Equation (6)) for deciding which of the predictive average up-direction demands PUL(1)–PUL(3) and predictive average down-direction demands PDL(1)–PDL(3) of the adjacent sections I–III the prediction values of the up-direction demand and down-direction demand in the adjusting sections [I, II] and [II, III] are similar to. In memory areas 66 and 67, there are respectively stored the numbers of elapsed days DAY(2) and DAY(3) which express the numbers of days elapsed after the boundaries T(2) and T(3) have been initialized or corrected. A memory area 68 stores a counter J which is used as a variable indicative of the sections I–III.

FIG. 7 shows the contents of the ROM 34. Referring to the figure, symbol 71a designates a memory area in which a parameter SA corresponding to the parameter a in Equation (4) is set at a value 1/6 and stored, while symbol 72a designates a memory area in which a parameter SB corresponding to the parameter b in Equation (6) is set at a value 1/6 and stored. In a memory area 73a, a constant value A corresponding to the number of decision days A in FIG. 2 is set at a value 10 and stored, while in a memory area 74a, a constant value B corresponding to the parameter B in FIG. 2 is set at a value 3 and stored. A memory area 75a stores the unit time DT which is set at a value 1 (This is assumed to be equal to 5 minutes. The same holds hereunder.). Memory areas 76a–79a store the initial values T1–T4 of the boundaries T(1)–T(4), which are set at 85 (=7:05), 99 (=8:15), 108 (=9:00) and 122 (=10:10), respectively. Memory areas 80a–82a store the initial values PU1–PU3 of the predictive average up-direction demands PUL(1)–PUL(3), which are set at 65 (passengers/5 minutes), 130 (passengers/5 minutes) and 109 (passengers/5 minutes), respectively. Memory areas 83a–85a store the initial values PD1–PD3 of the predictive average down-direction demands PDL(1)–PDL(3), which are set at 5 (passengers/5 minutes), 7 (passengers/5 minutes) and 20 (passengers/5 minutes), respectively. Memory areas 86a and 87a store the initial values E2 and E3 of the characters EL(2) and EL(3), which are set at 1.0 and 1.0, respectively.

Figure 8:
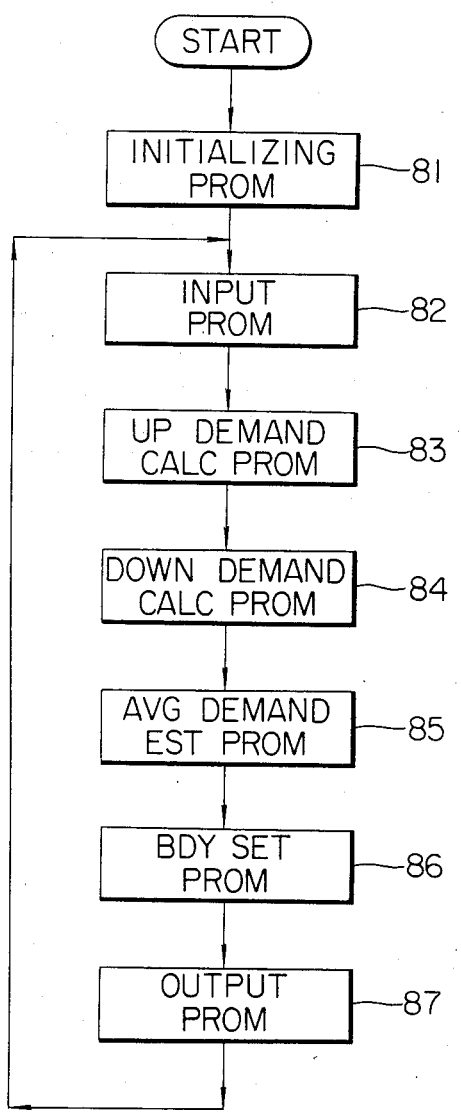
Figure 9:
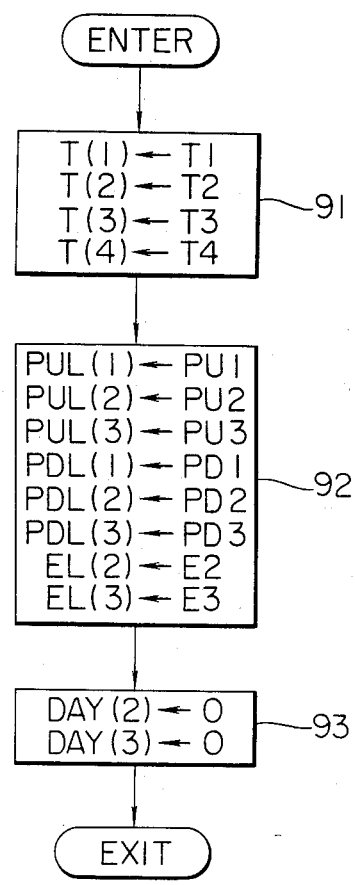

FIG. 8 illustrates the general arrangement of programs which are stored in the ROM 34 in order to set the boundaries. Referring to the figure, numeral 81 designates an initializing program for setting the initial values of various data. An input program 82 accepts signals from the input circuit 31 and sets them in the RAM 33. An up demand calculating program 83 calculates the average up-direction demands PU(1)–PU(3) measured in the respective sections I–III, while a down demand calculating program 84 calculates the average down-direction demands PD(1)–PD(3) similarly to the above. An average demand estimating program 85 calculates the predictive average up-direction demands PUL(1)–PUL(3) and predictive average down-direction demands PDL(1)–PDL(3) in the respective sections I–III. A boundary setting program 86 corrects the boundaries T(2) and T(3) of the respective sections I–III. An output program 87 transmits the predictive average up-direction demands PUL(1)–PUL(3) and predictive average down-direction demands PDL(1)–PDL(3) from the output circuit 35 to the group supervisory system 11 through the signal lines 35a and 35b, respectively.

The demand estimation apparatus constructed as thus far described operates as follows.

First, the numbers of persons who have gotten on the cages 14a–14c are respectively calculated by the number-of-getting on persons calculation means 16a–16c. Among these numbers of persons, the numbers concerning the ascent operations are applied to the numbers-of-ascending persons addition means 21, and the numbers concerning the descent operations are applied to the numbers-of-descending persons addition means 22, in such a manner that the number-of-getting on persons signals 17a–17c are switched by the switching means 18a–18c. The respective numbers of the persons who have gotten on the cages are added, whereupon the up-direction number-of-passengers signal 21a and down-direction number-of-passengers signal 22a are provided and sent to the input circuit 31. Simultaneously therewith, the number of counts produced when the value 1 is counted every 5 minutes since a time 0 o'clock is provided as the timing signal 23a from the clock means 23, and it is sent to the input circuit 31.

On the other hand, when the control means 30 is first connected to a power source (not shown), the initializing program 81 is actuated. More specifically, as illustrated in detail in FIG. 9, the initial values T1–T4 are respectively set for the boundaries T(1)–T(4) at Step 91. Subsequently, at Step 92, the initial values PU1–PU3 are respectively set for the predictive average up-direction demands PUL(1)–PUL(3), the initial values PD1–PD3 are respectively set for the predictive average down-direction demands PDL(1)–PDL(3), and the initial values E2 and E3 are respectively set for the characters EL(2) and EL(3). Next, when the initial value 0 (zero) is set for the numbers of elapsed days DAY(2) and DAY(3) at Step 93, the control flow shifts to the input program 82.

The input program 82 is a well-known program which feeds the input signal from the input circuit 31 into the RAM 33. By way of example, when the time is 8 o'clock, the input program reads the value 96 from the input circuit 31 and shifts it to the memory area 41 so as to set the time TIME at 96. Likewise, the up-direction number-of-passengers signal 21a is accepted and stored as the up-direction demand LDU, while the down-direction number-of-passengers signal 22a is accepted and stored as the down-direction demand LDD.

Figure 10:
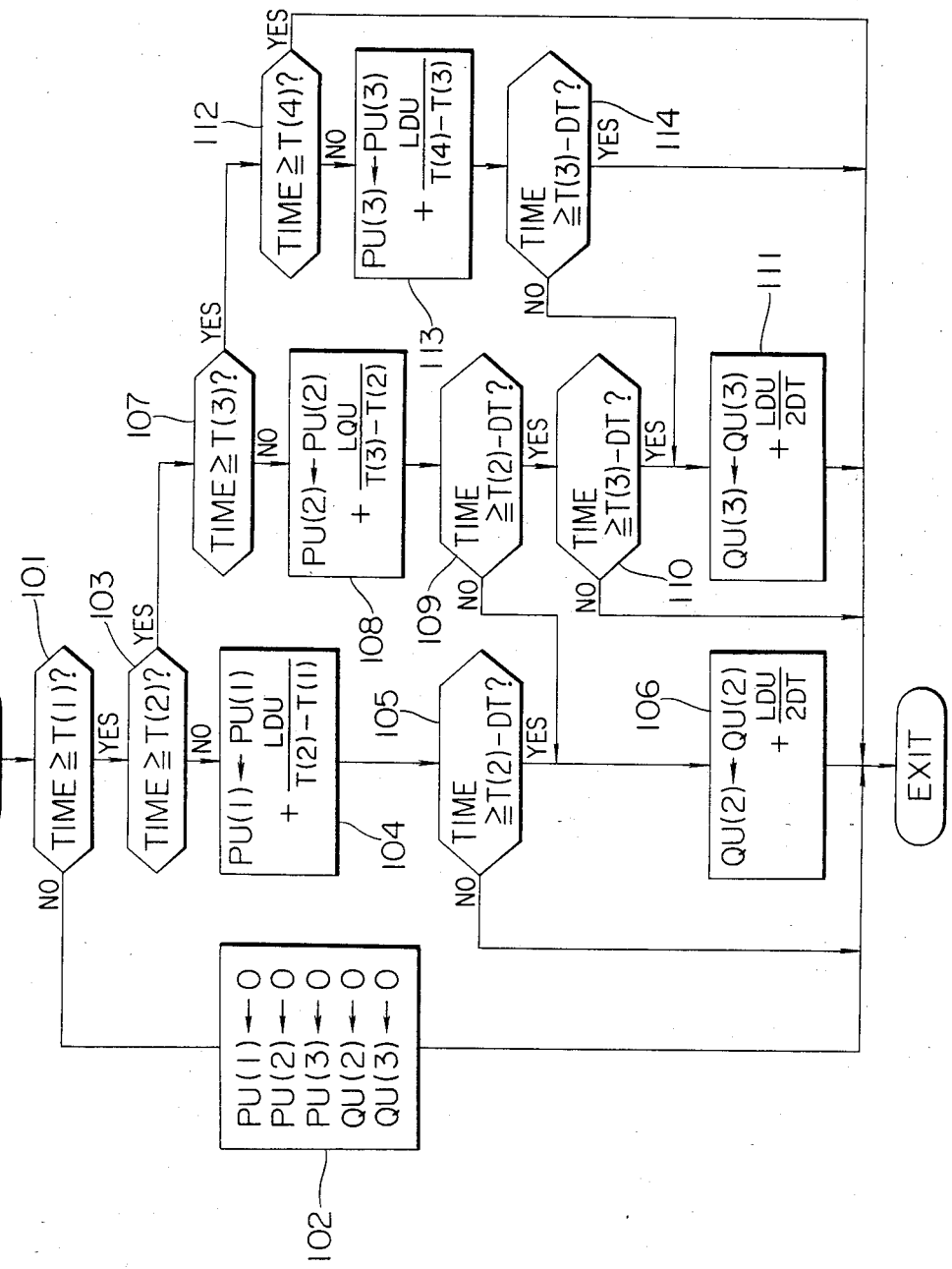

In the next place, the operations of the up demand calculating program 83 will be explained with reference to FIG. 10.

At Step 101, it is decided whether or not the time zone in which the average demand is to be calculated has been reached. When the time TIME is smaller than the boundary T(1), the control flow proceeds to Step 102, at which all the average up-direction demands PU(1)–PU(3), QU(2) and QU(3) are set at 0 (zero) as the initializing operation for the calculation of the average demand. When the time TIME becomes equal to or greater than the boundary T(1) at Step 101, the control flow proceeds to Step 103. When the time TIME is smaller than the boundary T(2) here, the control flow proceeds to Step 104, at which the average up-direction demand PU(1) of the section I is corrected by the use of the up-direction demand LDU measured anew, so as to increase to the amount of the up-direction demand per unit time DT as denoted by LDU/{T(2)−T(1)}. At Step 105, it is decided whether or not the adjusting section [I, II] has been reached. When the time TIME is TIME≧T(2)−DT, the control flow proceeds to Step 106, at which the average up-direction demand QU(2) of the adjusting section [I, II] is corrected by the use of the up-direction demand LDU measured anew, so as to increase to the amount of the up-direction demand per unit time as denoted by LDU/2·DT. When the time TIME is T(2)≦TIME<T(3), the control flow proceeds along Steps 103→107→108, at which the average up-direction demand PU(2) of the section II is corrected in the same manner as at Step 104. When the time TIME is TIME<T(2)+DT at Step 109, the control flow proceeds to Step 106, at which the average up-direction demand QU(2) of the adjusting section [I, II] is corrected so as to increase to the amount of the up-direction demand per unit time DT as denoted by LDU/2·DT. If the time TIME is T(2)+DT≦TIME at Step 109, the control flow proceeds to Step 110 and further proceeds to Step 111 subject to TIME≧T(3)−T(3)−DT. Here, the average up-direction demand QU(3) of the adjusting section [II, III] is corrected in the same manner as at Step 106. Besides, if the time TIME is T(3)≦TIME<T(4), the control flow proceeds along Steps 101→112→113, at which the average up-direction demand PU(3) of the section III is corrected in the same manner as at Step 104. Besides, if TIME<T(3)+DT holds at Step 114, the control flow proceeds to Step 111, at which the average up-direction demand QU(3) of the adjusting section [II, III] is corrected in the same manner as at Step 106.

In this way, the average up-direction demands PU(1)–PU(3) and QU(2) and QU(3) of the sections I–III and the adjusting sections [I, II] and [II, III] are sequentially corrected in the up demand calculating program 83.

The operations of the down demand calculating program 84 are as follows.

Likewise to the up demand calculating program 83, the down demand calculating program 84 sequentially corrects the average down-direction demands PD(1)–PD(3), QD(2) and QD(3) of the sections I–III and the adjusting sections [I, II] and [II, III]. Therefore, the operations of this program 84 are readily understood from the up-direction calculating program 83 described above and will not be further explained.

Figure 11:
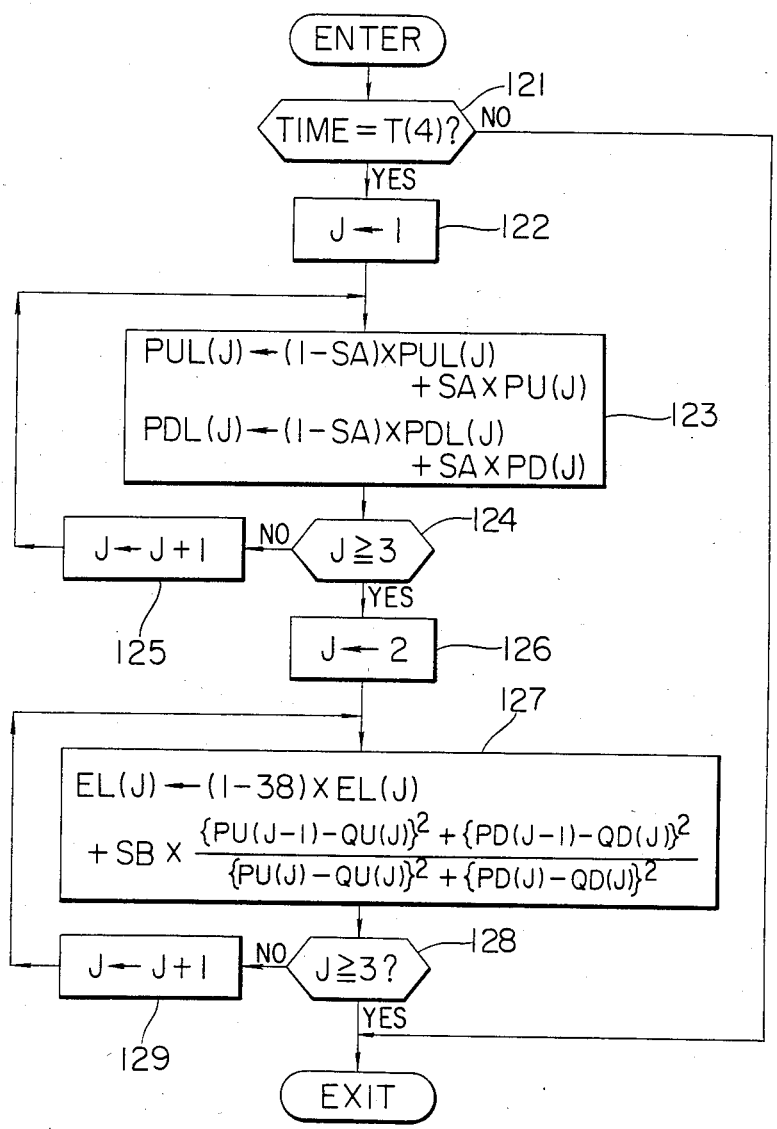

Next, the operations of the average demand estimating program 85 will be explained with reference to FIG. 11.

Only when the time TIME arrives at the boundary T(4) which is the end time of the section III, the following Steps 122-219 are executed. At this time, the control flow proceeds from Step 121 to Step 122, at which the counter J is initialized to 1 (one). At Step 123, the predictive average up-direction demand PUL(J) calculated till the preceding day is multiplied by (1−SA) and is added to the average up-direction demand PU(J) just observed on the particular day multiplied by SA, to set a predictive average up-direction demand PUL(J) anew. Likewise, the predictive average down-direction demand PDL(J) is set again. The calculations of Steps 123-125 are repeated while the counter J is being increased by 1 (one) each time the predictive average up-direction demand PUL(J) and the predictive average down-direction demand PDL(J) are calculated in this way. When the demands have been calculated up to the section III, J=3 is established, whereupon the program is shifted to Step 126.

Next, the characters EL(2) and EL(3) are calculated at Steps 126-129. At Step 126, the counter J is initialized to 2. Step 127 sets a character EL(J) anew, the sum of the addition between a value obtained in such a way that the character EL(J) calculated till the preceding day is multiplied by (1−SB), and a value obtained in such a way that a value found by the use of the average up-direction demaFPU(J−1), PU(J) and QU(J) and average down-direction demands PD(J−1), PD(J) and QD(J) just observed on the particular day is multiplied by SB. At Step 128, it is decided whether or not all the characters EL(J) in the adjusting sections [I, II] and [II, III] have been calculated. If J<3 holds, the counter J is increased by 1 (one) at Step 129, whereupon the control flow returns to Step 127 again.

In this fashion, in the average demand estimating program 85, the predictive average up-direction demands PUL(1)-PUL(3) and predictive average down-direction demands PDL(1)-PDL(3) in the respective sections I-III are corrected every day, and simultaneously, the characters EL(2) and EL(3) necessary for correcting the boundaries T(2) and T(3) are corrected.

Figure 12:
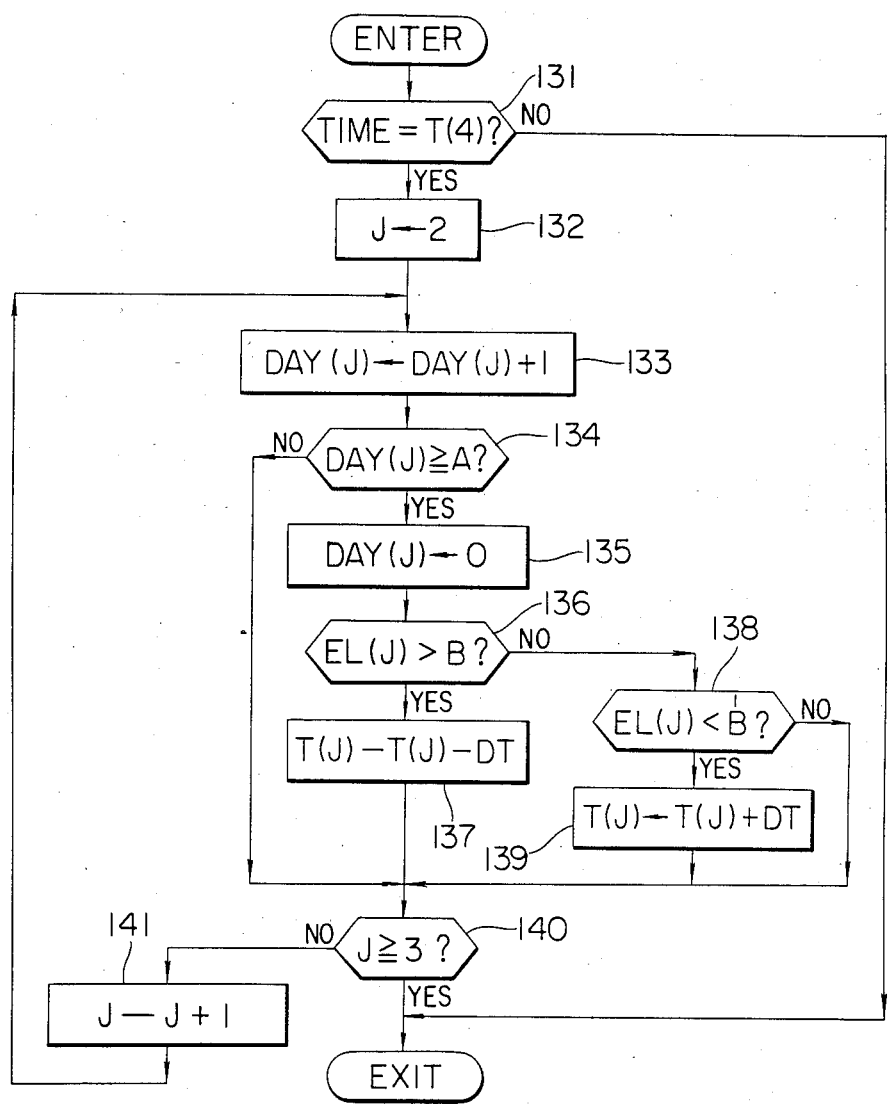

Now, the operations of the boundary setting program 86 will be explained with reference to FIG. 12.

When, at Step 131, the time TIME has reached the boundary T(4) being the end time of the section III, the control flow proceeds from this Step 131 to Step 132, at which time the counter J is initialized to 2. At Step 133, the number of elapsed days DAY(J) is increased by 1 (one). At Step 134, the number of elapsed days DAY(J) is compared with the constant value A (=10) which is the number of decision days. If DAY(J)<A holds, the control flow proceeds to Step 140 without correcting the boundary T(J). Here, it is decided whether or not calculations have ended for all the boundaries. If the counter J≧3 holds, the calculation of the boundary setting program 86 is ended. In contrast, if the counter J<3 holds, the control flow proceeds to Step 141, at which the counter J has 1 (one) added thereto, whereupon the control flow returns to Step 133 again in order to execute the calculations on the next boundary T(J). When, at Step 134, the number of elapsed days DAY(J) is 10, the control flow proceeds to Step 135, at which the number of elapsed days DAY(J) is reset to 0 (zero). It is assumed that the characters EL(2)=10 and EL(3)=2 have been calculated in the average demand estimating program 85. Then, for the counter J=2, EL(2)=10<B (=3) holds at Step 136. The control flow therefore proceeds to Step 137, at which the boundary T(2) (initialized value being supposed 99) between the sections I and II is subtracted from the unit time DT, and 99−1=98 is set anew. For the counter J=3, EL(3)=2<B (=3) holds at Step 136, so that the control flow proceeds to Step 138. Here, since EL(3)=2>1/B (=⅓) also holds, the boundary T(3) (initialized value being supposed at 108) between the sections II and III is not corrected. If the character EL(3)=0.1 holds, EL(3)<1/B is established. In this case, therefore, the control flow proceeds to Step 139, at which the boundary T(3) has the unit time DT added thereto, and 108+1=109 is set anew.

In this fashion, in the boundary setting program 86, the boundary T(J) is corrected with the value of the character EL(J) every fixed cycle.

Although the corrections of the boundaries T(J) have been described as being collectively performed at the time TIME=T(4), it is also allowed to individually perform the correction of the boundary T(2) at the time TIME=T(3) and the correction of the boundary T(3) at the time TIME=T(4).

Moreover, the unit time DT has been set at 5 minutes, the number of decision days A at 10, and the parameter B at 3. However, they are not restrictive, but they are respectively set at values which conform with the content, properties, fluctuating magnitudes etc. of the demand to be estimated.

In the above embodiment, the estimation value $q_k(l)$ of the demand of the adjusting section has not been directly calculated, but the character $\eta_k(l)$ which expresses the extent of similarity to the estimation values of the demands of the adjacent sections has been calculated daily in accordance with Equations (6) and (7). This is a measure taken in order to reduce the storage capacity required therefore. In case the memory utilized has the capacity for storing the data, the estimation value $\hat{q}_k(l)$ of the demand of the adjusting section may be calculated likewise to the calculation of the estimation value $\hat{P}_k(l)$ of the demand of each section, whereupon the character $\eta_k(l)$ may be calculated in accordance with Equation (8).

In addition, although the above embodiment has evaluated the character $\hat{\eta}_k(l)$, expressive of the extent of similarity between the estimation values of demands, by comparing the estimation values with reference to "distances" in a multidimensional space as denoted by Equations (6) and (7), the expedient for evaluating the character $\hat{\eta}_k(l)$ is not restricted to Equations (6) and (7) (or Equation (8)).

Furthermore, according to the foregoing embodiment, the adjusting section has been provided with the boundary as the center, but a similar effect can be achieved even when the adjusting section is provided in the vicinity of the boundary in a manner to deviate from the boundary.

Furthermore, it is to be understood from the foregoing embodiment that the invention is also applicable to a case of predicting demands in four or more sections or a case of predicting demands for respective floors.

Furthermore, it is to be understood that the invention is not restricted to the case of estimating the traffic volume of elevators, but that it is also applicable to cases of estimating various demands such as electric power demand and water quantity demand.

As set forth above, in an apparatus wherein a demand fluctuating substantially cyclically is divided into a plurality of sections at predetermined time intervals and wherein the demand is estimated for each section on the basis of the measured result of the demand in the section, this invention consists in that an adjusting section is set in the vicinity of the boundary between two sections adjoining each other, and that the estimation value of the demand in the adjusting section is compared with the respective estimation values of the two sections, so as to shift the boundary in the direction of widening the section which has the estimation value closer to the estimation value of the adjusting section. Therefore, the demand in the vicinity of the boundary is estimated with the estimation value of the widened section, which brings forth the effect that the demand in the vicinity of the boundary can be estimated at high precision.

What is claimed is:

1. A demand estimation apparatus for controlling machines wherein a cycle of a substantially cyclically fluctuating demand is divided into a plurality of sections of given time width and wherein an estimated value of the demand in each section is found on the basis of a measured result of the demand in the section, said apparatus comprising:

means for setting ad adjusting section having a time width smaller than said given time width of said adjoining sections to include a boundary between sections adjoining each other, means for comparing an estimated demand value of said adjusting section obtained from a measured result of the demand for a predetermined period in said adjusting section, with estimated demand values of said two sections adjoining the adjusting section and for correcting said boundary in one direction or the opposite direction in accordance with the comparison so that the average estimated demand value in the adjusting section is substantially intermediate the estimated demand values of both adjoining sections, delivering means for delivering the adjusted estimated demand values of the adjoining sections with the corrected boundary, and means for controlling machines in accordance with the adjusted values.

2. A demand estimation apparatus according to claim 1 wherein said adjusting section includes said boundary between said adjoining sections and said boundary remains within said adjusting section after being corrected.

3. A demand estimation apparatus according to claim 1 wherein said boundary is corrected in a direction of widening a section of said two adjoining sections which has an average demand closer to said average demand of said adjusting section.

4. A demand estimation apparatus according to claim 3 wherein said boundary is not corrected when a correction was made within a predetermined number of days in the past, and said boundary is corrected when said correction was made before said predetermined number of days.

5. A demand estimation apparatus according to claim 3, wherein said boundary is corrected every predetermined unit time.

6. A demand estimation apparatus according to claim 5, wherein said adjusting section is set at integral times of said unit time.

7. A demand estimation apparatus according to claim 1 wherein said estimated demand values are delivered to an elevator group supervisory system for controlling the operation of elevator cages.

8. A demand estimation apparatus according to claim 7 wherein said demand values are measured by the number of passengers who get on and off cages of said elevators.

* * * * *